3,022,162
BRAZING ALLOYS
Ralph G. Donnelly, Oak Ridge, Ralph G. Gilliland, Knoxville, and Gerald M. Slaughter, Oak Ridge, Tenn., assignors to the United States of America as represented by the United States Atomic Energy Commission
Filed July 25, 1960, Ser. No. 45,250
5 Claims. (Cl. 75—165)

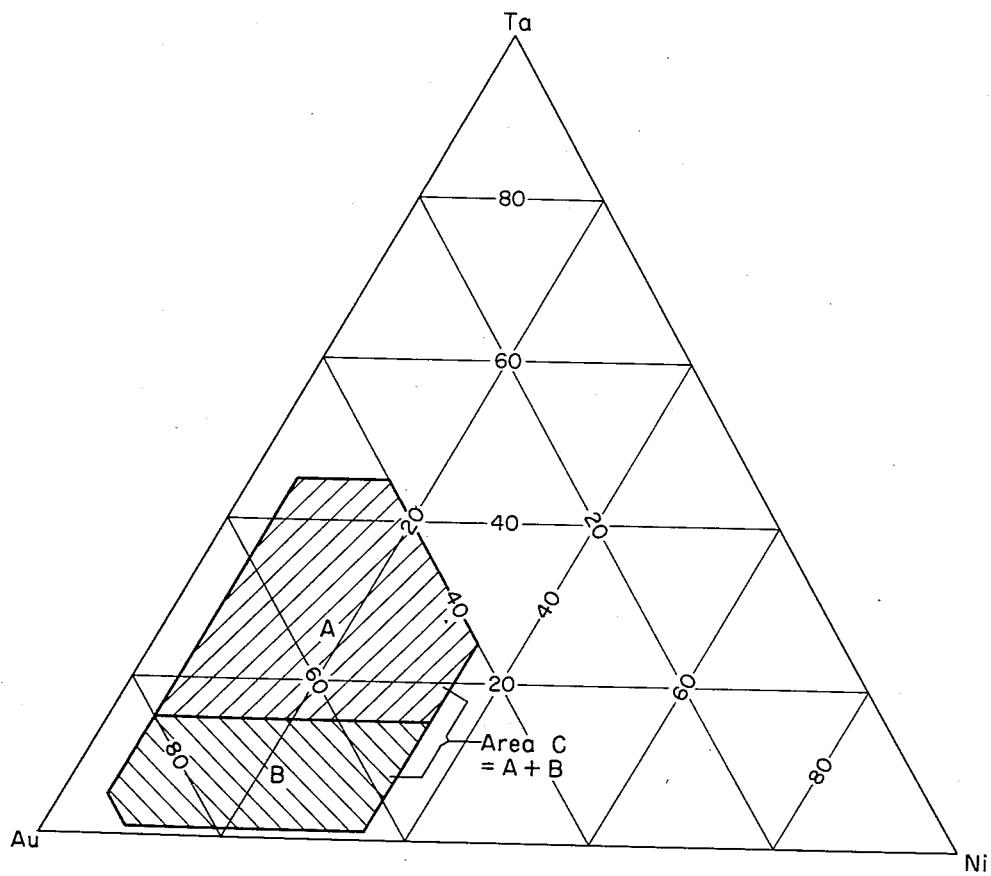

The present invention relates generally to a new class of brazing alloys and to a method of brazing graphite parts to a corrosion resistant metal or alloy using said brazing alloys to form a corrosion resistant joint having useful strength at high temperatures. The invention is further directed to forming graphite-to-graphite brazed joints of the character described.

Graphite is useful as a material of construction in many high temperature applications. It is particularly useful in many areas of nuclear technology because of its excellent moderator and reflector qualities which are combined uniquely with high temperature structural strength and stability. The state of the art of graphite technology has now developed to a point where graphite can be machined to about the same degree of precision obtained with machinable metals. For example, internal passages and other intricate geometric forms and shapes that can be made in metals can be duplicated by preforming graphite into several components through the use of die-sinking or pattern-making techniques or by using a profile milling machine. In order to form a desired integral assembly where as least a portion of said assembly is comprised of graphite parts, the formation of reliable graphite-to-graphite and graphite-to-metal joints is required. It is therefore obvious that the full utilization of graphite as a structural material depends to a large extent upon the development of suitable joining techniques for joining graphite components and graphite containing assemblies.

It is an object of the present invention to provide a novel method of brazing graphite parts such that the strength and corrosion resistance of the resultant brazed joint is at least substantially equal to the graphite to be joined at elevated temperatures up to about 800° C.

The provision of such an improved joint constitutes a further object of this invention.

A still further object of this invention resides in a new class of brazing alloys for producing said improved joint.

Other objects and advantages will be apparent from the ensuing description taken in conjunction with the accompanying FIGURE in which the cross-hatched areas thereof define the class of alloys (in weight percentages) useful in the brazing method to be described.

In the figure, the hatched area "A" defines the preferred alloys found preferable for use in forming graphite-to-graphite brazed joints; area "B" defines the preferred alloys useful in forming joints between graphite and a refractory metal, such as tungsten, molybdenum, tantalum, zirconium, titanium, niobium, and rhenium, or alloys containing at least one of said metals as essential alloying ingredients; and area "C" (area "A" plus area "B") defines the total useful range of brazing alloy compositions which may be used with advantage in forming either graphite-to-graphite or graphite-to-refractory metal brazed joints.

We have found that graphite-to-graphite and graphite-to-metal parts can be brazed together with the class of herein defined gold-nickel-tantalum alloys by the method herein to be described to produce a corrosion resistant brazed joint whose strength is at least equal to that of the graphite portion of the joint. As used here, the term "corrosion resistance" refers to the resistance of corrosion of brazing alloys to fused fluoride salt compositions. More particularly, a brazing alloy is deemed corrosion resistant if, upon immersion in a molten fluoride eutectic mixture of LiF and $BeF_2$ for 100 hours, it undergoes a loss in weight of less than about 0.1%.

The brazing alloys within the scope of this invention contain as essential ingredients 40 to 90 percent by weight of gold, 5 to 35 percent by weight of nickel, and 1 to 45 percent by weight of tantalum. Although the strength and corrosion resistance of these alloys are derived from all three constituents, the presence of tantalum also serves as an excellent wetting agent since it readily forms carbides when molten and in contact with the graphite. We have found that the concentration of tantalum in the alloy is critical in that alloys having a tantalum concentration greater than 45 percent by weight render the resulting alloy too hard and brittle to form a joint of useful strength. Molten alloys containing from 1 to 45 percent by weight tantalum wet and flow smoothly on the surfaces to be joined. When solidified such alloys form joints at least at strong as the graphite portion of the brazed joint. Thus, in forming graphite-to-metal brazed joints, alloys within the area "C" of the accompanying figure may be used to advantage to form strong and corrosion resistant joints under high temperature conditions, i.e., temperatures in the range 30° C. to 800° C. In forming graphite-to-metal bonds, optimum wetting and flow properties will be obtained with the brazing alloys defined by area "B" of the figure.

Alloys containing less than 1 percent tantalum by weight exhibit little, if any, wettability with respect to graphite. We have found that the degree of wetting required for forming a satisfactory graphite-to-graphite bond is somewhat higher than that necessary for forming joints between graphite and refractory metals. Hence, a specific and preferred embodiment of our invention resides in the use of a gold-nickel-tantalum brazing alloy containing from 15 to 45 percent by weight of tantalum as defined by the alloy compositions within area "A" of the accompanying figure. More particularly, alloys containing from 15 to 45 percent by weight of tantalum and no greater than about 10 percent by weight of nickel have been found to produce the optimum combination of wettability, flowability, and strength and corrosion resistance of the resulting graphite-to-graphite brazed joint.

In preparing a desired brazing alloy, the gold, nickel and tantalum are charged, in weighed increments, into an arc melting furnace which may comprise a water-cooled copper crucible and a tungsten electrode. The charge is melted in an inert atmosphere such as argon or helium to prevent contamination of the melt. The resulting melt is then solidified into an ingot. Alloy ingots containing less than about 15 percent tantalum may be extruded to a desired wire or rod size to be preplaced about the areas to be braze bonded. Alloys containing greater than 15 percent tantalum have been found to be too brittle to be preformed into wire or narrow rod size. These alloys can be comminuted into small chunks or to powder as desired. In its powder condition said alloy can be uniformly mixed with a binder such as nitrocellulose or an acrylic resin to form a paste, it being essential that the binder burn away leaving no ash to contaminate the brazed joint. In whatever form prepared, the braze material is placed about the surfaces to be joined in a furnace. The joint and surrounding braze material may be heated by means of a radio frequency induction heater to above the liquidus of the brazing alloy and held at temperature until the melted alloy is observed to melt and flow freely over the surfaces to be joined. At this point the heating means is switched off and the melted alloy allowed to freeze to form the brazed joint. The brazing alloys of this invention generally have a solidus and liquidus temperature lying within the range 1200° C. to 1400° C. If a gold-nickel-tantalum alloy having a higher solidus and liquidus temperature is used, then corresponding higher furnace brazing temperatures are necessary. The brazing operation should be conducted in vacuum or under an inert atmosphere such as helium or argon, thus eliminating the necessity of a brazing flux and reducing any contamination in the brazed joint.

Brazed joints made in accordance with this procedure and with the alloys within the scope of this invention have been found to wet and flow smoothly and in all cases tested have been found to form corrosion resistant graphite-to-graphite and graphite-to-metal joints wherein the joints produced are at least as strong as the graphite itself. Thus, a T joint was formed between a 3/16" thick bar of type Agot graphite (a reactor grade of graphite) and a 1/4" thick molybdenum plate with a brazing alloy containing 60 percent by weight of gold, 10 percent by weight of nickel, and 30 percent by weight of tantalum. Deliberate force applied to the joint area by attempting to bend the T joint through an angle resulted in cracking the graphite portion of the joint without any apparent weakening of the brazed joint.

In another case a fine-grained, extruded, graphite tubing (7/8" I.D., 1 1/4" O.D.) was braze bonded to a 1/4" thick molybdenum header plate using a braze alloy containing 60 percent gold, 10 percent nickel, and 30 percent tantalum. The melted alloy was observed to flow smoothly around the abutting graphite and molybdenum surfaces and, on cooling, a clean, continuous braze fillet was discerned about the internal as well as external surfaces of the graphite tube abutting the molybdenum header plate. Similar brazed joints between graphite and other refractory metals using the alloys defined within area "C" of the accompanying figure have been produced wherein the joints were at least as strong as the graphite component thereof.

In forming the many possible brazed graphite joints in accordance with this invention, consideration should be given to the proper matching of the coefficients of expansion of the materials being brazed together. A wide difference between these coefficients may lead to considerable differential stress with subsequent weakening of the joint.

While the invention has been described in its present preferred embodiment, it will be obvious to those skilled in the art that various changes and modifications may be made without departing from the scope thereof. The following claims are intended to include all such modifications.

What is claimed is:

1. A brazing alloy which, in the molten state, is characterized by excellent wettability and flowability, said alloy being capable of forming a corrosion resistant brazed joint wherein at least one component of said joint is graphite and the other component is a corrosion resistant refractory metal and consisting essentially of 40–90 percent by weight of gold, 5–35 percent by weight of nickel, and 1–45 percent by weight of tantalum.

2. A brazing alloy for forming a corrosion resistant bond between graphite articles, wherein the strength of said bond is at least equal to the graphite articles to be bonded, said alloy in the molten state, being capable of wetting and flowing freely on the surfaces to be bonded, said alloy consisting essentially of 40–90 percent by weight of gold, 5–35 percent by weight of nickel, and 15–45 percent by weight of tantalum.

3. A ternary brazing alloy of particular utility in forming a brazed joint between graphite parts wherein the strength of said joint is at least equal to the high temperature strength of the graphite to be bonded, said alloy consisting essentially of 15–45 percent by weight of tantalum, 5–10 percent by weight of nickel, and the balance gold.

4. In a process for forming a brazed joint between a refractory metal part and a graphite part, the steps which comprise disposing selected surfaces of said parts in abutting relationship, placing a brazing alloy along at least one of said surfaces, said brazing alloy containing as essential ingredients 40–90 percent by weight of gold, 5–35 percent by weight of nickel, and 1–45 percent by weight of tantalum, heating said surfaces and brazing alloy to above the melting point of said alloy until the molten alloy wets and flows freely along said surfaces and thereafter cooling said alloy to braze said parts together.

5. The process according to claim 4 in which the brazed joint is formed in an inert atmosphere.

References Cited in the file of this patent

UNITED STATES PATENTS 2,148,040     Schwarzkopf _____ Feb. 21, 1939

FOREIGN PATENTS 883,104     France _____ Sept. 9, 1946

OTHER REFERENCES

Miller: Tantalum and Niobium, Metallurgy of the Rarer Metals—6, page 1 relied on.